Figure 1:
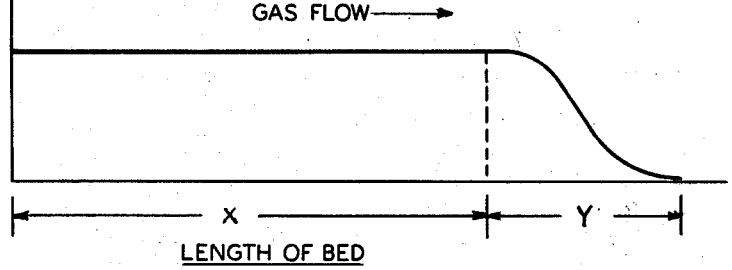

United States Patent Office 3,161,488
Patented Dec. 15, 1964

3,161,488
WATER ADSORPTION PROCESS
Sylvander C. Eastwood, Woodbury, and Luther J. Reid, Jr., West Deptford Township, Gloucester County, N.J., and Albert B. Schwartz, Philadelphia, Pa., assignors to Socony Mobil Oil Company, Inc., a corporation of New York
Filed Jan. 18, 1961, Ser. No. 83,413
9 Claims. (Cl. 55—30)

This invention relates to a novel adsorption process. More particularly, this invention relates to an adsorption process for the separation of one or more components from a stream of fluid containing such components, this process comprising passing the stream successively through two adsorbent-containing zones, the first zone containing adsorbent having a high volume porosity and a comparatively high average pore diameter, the second zone containing an adsorbent having pores of comparatively small average pore diameter.

The usual adsorbents used to effect selective separation vary considerably, both as to their compositions, crystallinities, and pore structures. The degree of specificity of a particular adsorbent will depend upon a number of factors, such as the nature of the surface, the type of pore structure, etc. Typical commercial adsorbents include fuller's earth, bauxite, synthetic aluminas, acid-treated clays, magnesia, silica gel, silica-alumina, carbon, and the like. Some of the physical properties and also the water adsorption capacity for a number of these commercial adsorbents are given in Table I.

TABLE I

| | Packed Density, lbs./cu. ft. | Pore Volume, cc./g. | Porosity, Percent Volume | Average Pore Diameter, Angstroms | Water Adsorption Capacity, lbs. H₂O/cu. ft. Bed | | | |
|---|---|---|---|---|---|---|---|---|
| | | | | | 10% RH [1] | 20% RH [1] | 40% RH [1] | 80% RH [1] |
| Silica-Alumina [2] | 51 | 0.36 | 45 | 22 | 3.3 | 5.4 | 11.1 | 18.2 |
| Silica Gel | 47 | 0.37 | 44 | 22 | 2.9 | 4.9 | 10.2 | 17.2 |
| Activated Alumina-1 | 42 | 0.56 | 64 | 71 | 2.9 | 4.0 | 6.2 | 13.2 |
| Activated Alumina-2 | 55 | 0.34 | 53 | 50 | 2.8 | 3.6 | 5.4 | 15.3 |
| Activated Carbon | 34 | 0.71 | 59 | 29 | | | | |

[1] Relative Humidity.
[2] Approximately 97% SiO₂ and 3% Al₂O₃.

An adsorbent which exhibits a desirably high efficiency when used with streams highly concentrated with the component to be removed but which exhibits a low efficiency at lower concentrations, must be used in exorbitant amounts if used alone, in order to effectively remove the desired component. This renders the removal process expensive and inefficient. Yet the use of other types of adsorbents, i.e., adsorbents offering good efficiencies at low concentrations, such as silica-alumina, silca-magnesia, silica-zirconia, etc., to effect the entire removal process is also quite expensive because of the comparative inefficiencies of such adsorbents when used at the initial higher concentrations.

Accordingly, it is an object of our invention to provide an improved adsorption process.

Another object is to provide an adsorption process for the efficient and economic selective separation of one or more components from a stream containing these components.

A further object is to provide an improved adsorption process whereby the adsorption capacity of a given size adsorbent bed will be markedly increased.

Yet another object is to provide an adsorption process wherein two adsorbents are used successively to thereby provide a greater volumetric adsorption capacity as compared to the use of a single adsorbent.

A further object is to provide an adsorption process for the dehydration of air.

Another object is to provide an adsorption process for the dehydration of hydrocarbons.

Another object is to provide an adsorption process for the simultaneous dehydration and recovery of liquid hydrocarbons from natural gas.

Additional objects will become apparent hereinafter.

Figure 2:
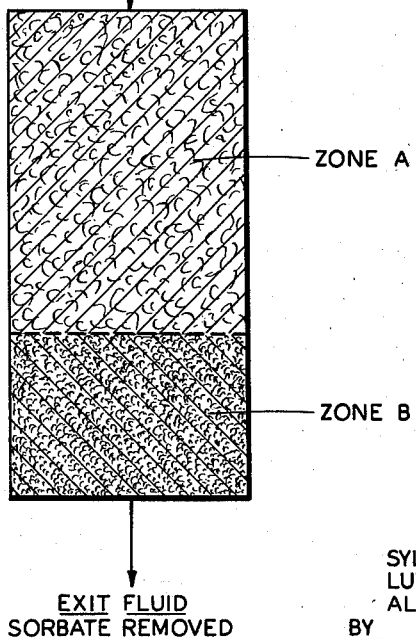

Our invention will be more fully understood by reference to the appended drawings, wherein:

FIG. 1 is a schematic representation of the dynamics occurring in an adsorption process; and FIG. 2 is a schematic diagram showing one embodiment of the process of our invention.

An adsorption process conveniently may be pictured as shown in FIG. 1. As the gas flows continuously through the bed containing adsorbent the adsorbate concentration will build up in the bed to thereby form a "wave" as shown in zone Y. At the "leading edge" of the wave the adsorbate concentrations in both the gas stream and the adsorbent are low. In contrast, at the "trailing edge" of the wave the concentrations tend to be rather high and frequently will be at the saturation concentration. The adsorbate concentration in the adsorbent is high and comparatively constant behind the trailing edge of the wave. This is illustrated by zone X. The length of the adsorption wave will be dependent upon a number of factors such as the particular adsorbent used, the composition of the gas stream, the velocity of the gas stream, the temperature and pressure under which the adsorption is carried out, etc.

In accordance with our invention, we have found that a very efficient and economical adsorption process may be secured when an adsorbent having a high porosity and a comparatively large average pore diameter is used in an initial zone and an adsorbent having pores of small average pore diameter is used in a secondary zone.

The adsorbent to be used in the initial zone of contact should have an average pore diameter of from about 30 to 100 angstroms. The average pore diameter is determined on the assumption that the pores of the catalyst essentially are cylindrical. Accordingly, the average diameter of the pores of a given adsorbent are related to the pore volume and surface area by the equation:

$$d = \frac{4V}{A}$$

where V is the volume of the pores in cubic centimeters, A is the surface area in square centimeters, and d is the diameter in centimeters. This equation makes use of the total pore volume and the surface area of the adsorbent. (A detailed discussion of how "average pore diameter" is determined is given in the text edited by P. H. Emmett and entitled "Catalysts, Volume I," at page 56, 1954 ed., Reinhold Publishing Corporation, New York.)

The adsorbent to be used in the initial zone of contact should also have a high volume porosity, preferably from 50 to 75 percent volume, but in any event in excess of 45 percent volume. In referring to porosity as percent volume we exclude voids between particles. Use of this term makes it unnecessary, when comparing different adsorbents, to correct for different skeletal densities and for variations in void space due to shape of particles. Porosity refers to pores in the initially formed gel and does not include pores introduced by shaping techniques such as pelleting and extruding.

For the secondary zone of contact which zone is to remove the desired component from the stream when such component is present in comparatively low concentration, it is imperative that the adsorbent used have pores of small average diameter, i.e., less than 30 angstroms.

Thus, in accordance with our invention the first adsorbent zone will contain an adsorbent having a high volume porosity preferably from about 50 to 75 percent volume but at least in excess of 45 percent volume, and having an average pore diameter of from about 30 to 100 angstroms, whereas the second zone will contain an adsorbent that is effective for the removal of the remainder of the desired component, which component will be present in relatively low concentration in the stream containing such component, so that such adsorbent will have pores of small average diameter, preferably of the order of from 15 to 25 angstroms, but in any event, less than about 30 angstroms.

By virtue of our invention, the combination of two such adsorbents will increase the adsorption capacity of a given size bed. Further, our invention permits the use of a relatively low cost adsorbent in the first zone (for removal of high concentrations of the component to be adsorbed). Further, by using the process of our invention there results a higher volumetric adsorption capacity as compared to a similar process using a single adsorbent, because adsorbents which have small pore diameters will generally also have a low pore volume.

It will be understood that the process of our invention has a wide variety of applications. For example, our process may be used in conjunction with either a vapor or liquid phase stream containing a component that is desired to be selectively separated therefrom. Typical applications include the recovery of valuable volatile solvents from processing streams, simultaneous dehydration and recovery of hydrocarbons from natural gas, the purification of gases such as, e.g., the removal of hydrogen sulfide from natural gas, the selective separation of hydrocarbons, the drying of organic liquids, the dehydration of natural gas, hydrocarbon streams, or air, etc.

The temperatures and pressures at which our adsorption process may be carried out will naturally vary, depending upon the specific type of selective separation desired. In general, we prefer that the adsorption be carried out at a temperature of from about −70 to 200° F. A more preferred range is from about 20 to 175° F. The adsorption may be carried out at atmospheric pressures or at elevated pressures and generally will be from atmospheric up to about 2000 pounds per square inch.

The optimum ranges of pressures will vary depending upon the particular system being processed. For example, in the dehydration of air the preferred pressure range is from about zero to 200 p.s.i.g., whereas in the dehydration of hydrocarbons such as ethylene, propylene, butadiene, acetylene, and the like (prior to using such hydrocarbons as raw materials for the manufacture of chemicals and polymers), the preferred pressure range is from 100 to 600 p.s.i.g. For simultaneous dehydration and recovery of liquid hydrocarbon from natural gas, the preferred range is from about 500 to 2000 p.s.i.g.

The flow rate of the fluid through the adsorbent will also vary, depending upon the particular separation being effected. In general, the flow rate should be from about 0.5 to 600 feet per minute. When the fluid is a gas the preferred flow rate is from about 3 to 600 feet per minute. For a liquid fluid, a flow rate of from about 1 to 20 feet per minute is preferred.

The process of our invention may be carried out in static or moving bed systems. In non-moving bed systems the two zones of the adsorbent may be housed in a single vessel or may be disposed in separate vessels. For a continuous system, either two continuous beds or one continuous and one static bed are required, with the gas or liquid stream flowing therethrough in series.

It will be understood that whereas FIG. 2 shows a downflow arrangement in which the fluid first contacts the adsorbent having at least 45 percent volume porosity and an average pore diameter of from 30 to 100 angstroms and then contacts the adsorbent having pores of less than 30 angstrom average diameter, our invention may also be utilized in an upflow arrangement. That is, fluid may be introduced at the bottom of the column and contacted first with the large-pore-volume adsorbent and then with the small pore diameter adsorbent located in the upper portion of the column.

After the adsorption cycle is complete the adsorbent may be regenerated in any one of the usual conventional methods such as thermal regeneration with a preheated purge gas, pressure reduction with or without a purge gas, use of a purge gas alone (to reduce the partial pressure), displacement of the sorbate with another more readily adsorbed component, etc. If a three tower type system is used, one tower is on adsorption, another is being regenerated, and the third is being cooled.

A comparison of the suitability of different silica-alumina adsorbents for the first zone (to remove the high concentration of component from the stream) and for the second zone (to remove the remaining lower concentration of component from the stream), is afforded by a consideration of the data in Table II.

TABLE II

*Comparison of Properties of Various Silica-Alumina [1] Adsorbents*

| Adsorbent Number | Packed Density, lbs./cu. ft. | Pore Volume, cc./g. | Porosity, Percent Volume | Average Pore Diameter, Angstroms | Water Adsorption Capacity, lbs. $H_2O$/cu. ft. bed | | | | Theoretical Maximum Capacity, lbs. $H_2O$/cu. ft. bed |
|---|---|---|---|---|---|---|---|---|---|
| | | | | | 10% RH [2] | 20% RH [2] | 40% RH [2] | 80% RH [2] | |
| 1 | 49 | 0.37 | 46 | 22 | 3.5 | 5.6 | 11.5 | 18.3 | 18.2 |
| 2 | 42 | 0.49 | 52 | 28 | 2.6 | 4.1 | 8.7 | 20.4 | 20.6 |
| 3 | 40 | 0.54 | 55 | 31 | 1.7 | 3.1 | 7.1 | 21.5 | 21.6 |
| 4 | 35 | 0.67 | 59 | 40 | 1.4 | 2.4 | 5.0 | 23.5 | 23.5 |

[1] 97% $SiO_2$, 3% $Al_2O_3$.  [2] Relative Humidity.

It will be noted that when drying air that is at 80% relative humidity, the pore volume of the adsorbent is essentially filled under equilibrium conditions. However, for effective drying at lower relative humidities only adsorbents 1 and 2, namely adsorbents having average pore diameters less than 30 angstroms and small individual pore volumes, are genuinely effective. This is borne out for air at much lower relative humidities as 40, 20 and 10 percent.

In accordance with our invention, when an adsorbent effective at lower concentrations, such as adsorbent 1, i.e., having a pore diameter of 22 angstroms, is used in successive combination with an other adsorbent effective at higher concentrations such as adsorbent 3, i.e., having a porosity of 55% volume and an average pore diameter of 31 angstroms, an unusually effective and efficient adsorptive separation results. This effect is illustrated by the following examples. All parts are by weight unless otherwise indicated.

EXAMPLE 1

Dynamic adsorption tests were made with adsorbents 1 and 3 of Table II. In another test, our process was compared with the above adsorption tests by using adsorbent 3 in the initial zone (to remove the high concentration of water in the stream) and by using adsorbent 1 in the second zone (to remove the lower concentration of remaining water in the stream). The tests were carried out at atmospheric pressure and as indicated in FIG. 2, that is, by passing an air stream of 80% relative humidity downflow through a three foot bed of adsorbent maintained at 80° F. The column containing the adsorbent had a daimeter of 0.75 inch. The column was immersed in water to maintain isothermal conditions. The flow rate was 40 feet per minute. In each case the run was continued until the dew point of the effluent reached −40° F. The amount of water adsorbed is expressed as the dynamic adsorption capacity. The results obtained were as follows:

| Adsorbent | Dynamic Adsorption Capacity Pounds per Cubic Foot of Bed | |
|---|---|---|
| | Experimental | Calculated |
| 67% of adsorbent 3 in top zone; 33% of adsorbent 1 in bottom zone (two zones) | 9.5 | 8.8 |

It will be noted that by using the two-zone process of our invention there were adsorbed 9.5 pounds per cubic foot of adsorbent. This compares to a calculated value of 8.8 pounds per cubic foot which would have been obtained if the adsorption capacity of the two zones were additive. Accordingly, it will be seen that the process of our invention confers a synergistic effect; that is, the resulting adsorption efficiency is greater than what would be expected by calculation.

Our invention also finds application in the simultaneous dehydration and recovery of liquid hydrocarbons from natural gas. Natural gas consists chiefly of methane, along with lower concentrations of ethane, propane, butane, pentane, hexane, and perhaps some heavier hydrocarbons. Usually some carbon dioxide, nitrogen, and water are also present. Hydrocarbons generally recovered in the adsorption unit are propane and heavier. The following examples illustrate such hydrocarbon recovery under conditions of atmospheric pressure.

EXAMPLES 2–4

These examples illustrate the application of our invention to the adsorption of pentane from a pentane-methane stream. Each test was made by passing a stream consisting of 32 volume percent methane and 68 volume percent pentane downflow through the adsorbent bed. The total volume of adsorbent used was held constant for each test, regardless of whether a one or two-adsorbent system was used. The adsorption column consisted of a six foot aluminum tube having a diameter of 1\$\frac{36}{64}\$ inches. The tests were carried out at atmospheric pressure and 80° F. The gaseous flow rate was 0.19 standard cubic foot [1] per minute. The length of the adsorption cycle was twenty minutes. Dynamic adsorption tests were made with each of single adsorbents A, B, C and D of Table III. Our two-adsorbent process was compared with the single adsorbent dynamic tests. Thus, in Example 2 the adsorbent bed consisted of 75 volume percent adsorbent A, silica-alumina (31 A. average pore diameter), placed in the top part of the bed, and 25 volume percent adsorbent B, silica alumina (22 A. average pore diameter), placed in the bottom part of the bed. Similarly, in Example 3 the bed contained 75 volume percent adsorbent A and 25 volume percent adsorbent E, silica magnesia. (No test was made using silica-magnesia alone.) In Example 4 the bed contained 50 volume percent adsorbent C (activated alumina) and 50 volume percent adsorbent B.

The results are tabulated in Table III. It will be noted that in both Examples 2 and 4 the actual amount of pentane adsorbed considerably exceeds the calculated value. Thus, Example 2 shows an adsorption of 146 grams of pentane, whereas the expected adsorption by calculation (75% of 135 plus 25% of 141) is only 136 grams. Similarly, Example 4 shows 133 grams of pentane adsorbed, as compared to a calculated expectation of only 121 grams (50% of 101 plus 50% of 141).

TABLE III

*Dynamic Adsorption of Pentane From Methane-Pentane Stream*

| Example No. | Adsorbent | Location in Column | Adsorbent Ident. | Porosity, percent Vol. | Avg. Pore Diam., A. | N-Pentane Adsorbed, g. | | Pentane Recovered, percent |
|---|---|---|---|---|---|---|---|---|
| | | | | | | Experimental | Calculated | |
| | 100% vol. Silica-Alumina | Throughout | A | 56 | 31 | 135 | | 62 |
| | Do | do | B | 45 | 22 | 141 | | 64 |
| | 100% vol. Act. Alumina-1 | do | C | 64 | 71 | 101 | | 46 |
| | 100% vol. Silica Gel | do | D | 44 | 22 | 127 | | 57 |
| 2 | 75% vol. Silica-Alumina | Top | A | 56 | 31 | 146 | 136 | 67 |
| | 25 vol. | Bot | B | 45 | 22 | | | |
| 3 | 75% vol. Silica-Alumina | Top | A | 56 | 31 | 143 | | 65 |
| | 25% vol. Silica-Magnesia | Bot | E | 41 | 19 | | | |
| 4 | 50% vol. Act. Alumina-1 | Top | C | 64 | 71 | 133 | 121 | 61 |
| | 50% vol. Silica-Alumina | Bot | B | 45 | 22 | | | |

Although the examples presented as illustrative of our invention have shown the use of non-crystalline adsorbents such as silica-alumina, activated alumina, silica gel, and the like, our invention also finds application using adsorbents having crystalline structure, such as the above-illustrated silica-magnesia, also clays and aluminas having well defined crystalline structures are suitable adsorbent materials for use in our invention, provided that such materials conform to the required porosities and average pore diameters described herein.

It will be understood that variations can be made without departing from the spirit and scope of our invention.

Having thus described our invention, what we desire to secure and claim by Letters Patent is:

---

[1] Occupying a volume of 1 cubic foot at 60° F. and at atmospheric pressure.

1. A method of selectively and economically separating a component from a stream of fluid containing said component comprising first passing said stream into contact with a solid porous adsorbent having a porosity of from about 50 to 75 percent volume and an average pore diameter of from about 30 to 100 angstrom units, and then passing said stream into contact with a solid porous adsorbent having an average pore diameter of from 15 to 25 angstrom units.

2. The method of claim 1 wherein said stream is gaseous.

3. The method of claim 1 wherein said stream is liquid.

4. A method of removing moisture from a gas containing said moisture comprising first passing said gas into contact with a solid porous adsorbent having a porosity of from about 50 to 75 percent volume and an average pore diameter of from about 30 to 100 angstrom units, and then passing said gas into contact with a solid porous adsorbent having an average pore diameter of from 15 to 25 angstrom units.

5. The method of claim 4 wherein said gas is air and said method is carried out at a temperature of from about 20 to 175° F. and at a pressure of from about zero to 200 pounds per square inch gage.

6. A method of removing moisture from a hydrocarbon stream containing said moisture comprising first passing said stream into contact with a solid porous adsorbent having a porosity of from about 50 to 75 percent volume and an average pore diameter of from about 30 to 100 angstrom units, and then passing said stream into contact with a solid porous adsorbent having an average pore diameter of from 15 to 25 angstrom units.

7. The method of claim 6 carried out at a temperature of from about 20 to 175° F. and a pressure of from about 100 to 600 pounds per square inch gage.

8. A method of simultaneously removing moisture and recovering liquid hydrocarbons from a natural gas stream, this method comprising first passing said stream into contact with a solid porous adsorbent having a porosity of from about 50 to 75 percent volume and an average pore diameter of from about 30 to 100 angstrom units, and then passing said stream into contact with a solid porous adsorbent having an average pore diameter of from 15 to 25 angstrom units.

9. The method of claim 8 carried out at a temperature of from about 20 to 175° F. and a pressure of from about 500 to 2000 pounds per square inch.

References Cited in the file of this patent

UNITED STATES PATENTS

| | | |
|---|---|---|
| 2,093,454 | Kistler | Sept. 21, 1937 |
| 2,698,305 | Plank et al. | Dec. 28, 1954 |
| 2,799,362 | Miller | July 16, 1957 |
| 2,910,139 | Matyear | Oct. 27, 1959 |
| 2,944,627 | Skarstrom | July 12, 1960 |

UNITED STATES PATENT OFFICE
CERTIFICATE OF CORRECTION

Patent No. 3,161,488                 December 15, 1964

Sylvander C. Eastwood et al.

It is hereby certified that error appears in the above numbered patent requiring correction and that the said Letters Patent should read as corrected below.

Columns 3 and 4, TABLE II, heading to last column, for "Theoretical Maximum Capacity, lbs. $H_2O$/cu. ft. bed" read -- Theoretical Maximum Adsorptive Capacity, lbs. $H_2O$/cu. ft. bed --; columns 5 and 6, TABLE III, under the column heading "Adsorbent", line 6 thereof, for "25 vol." read -- 25% vol. Silica-Alumina --.

Signed and sealed this 3rd day of August 1965.

(SEAL)
Attest:

ERNEST W. SWIDER
Attesting Officer

EDWARD J. BRENNER
Commissioner of Patents